April 13, 1965 A. BOYD 3,178,275
AUTOMATIC FEED FUSION MACHINES
Filed April 23, 1962 3 Sheets-Sheet 1
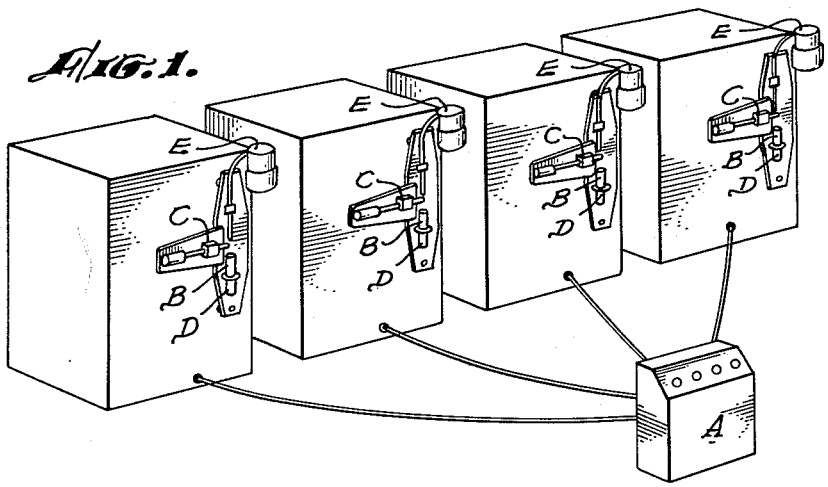
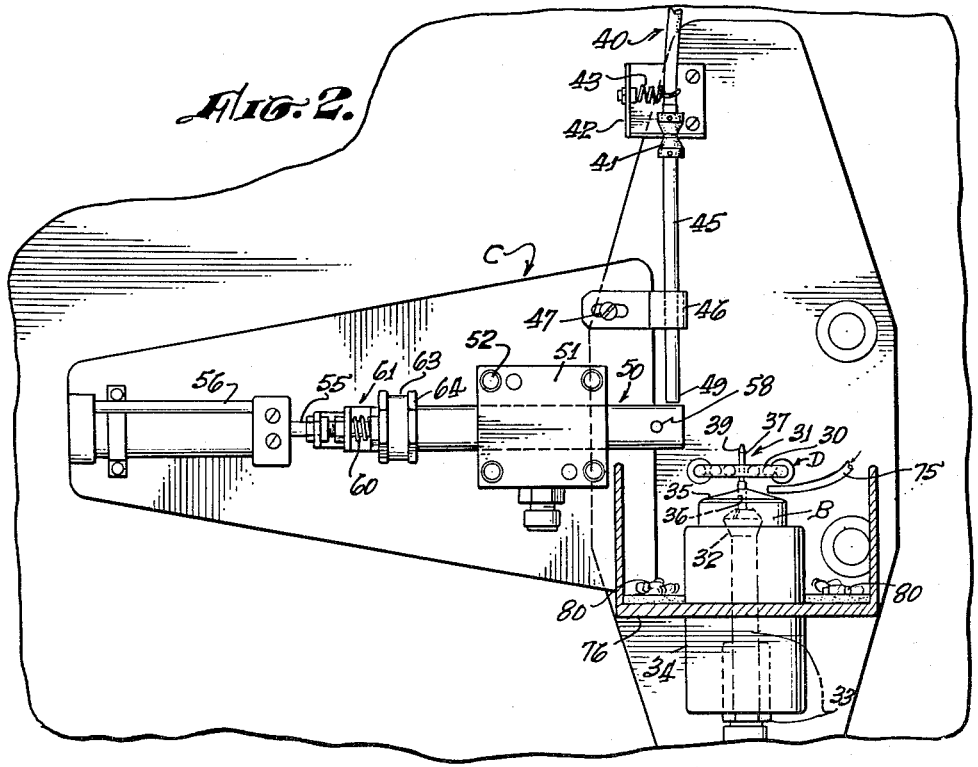
ALEXANDER BOYD,
INVENTOR.
BY HIS ATTORNEYS.
Spensley & Horn

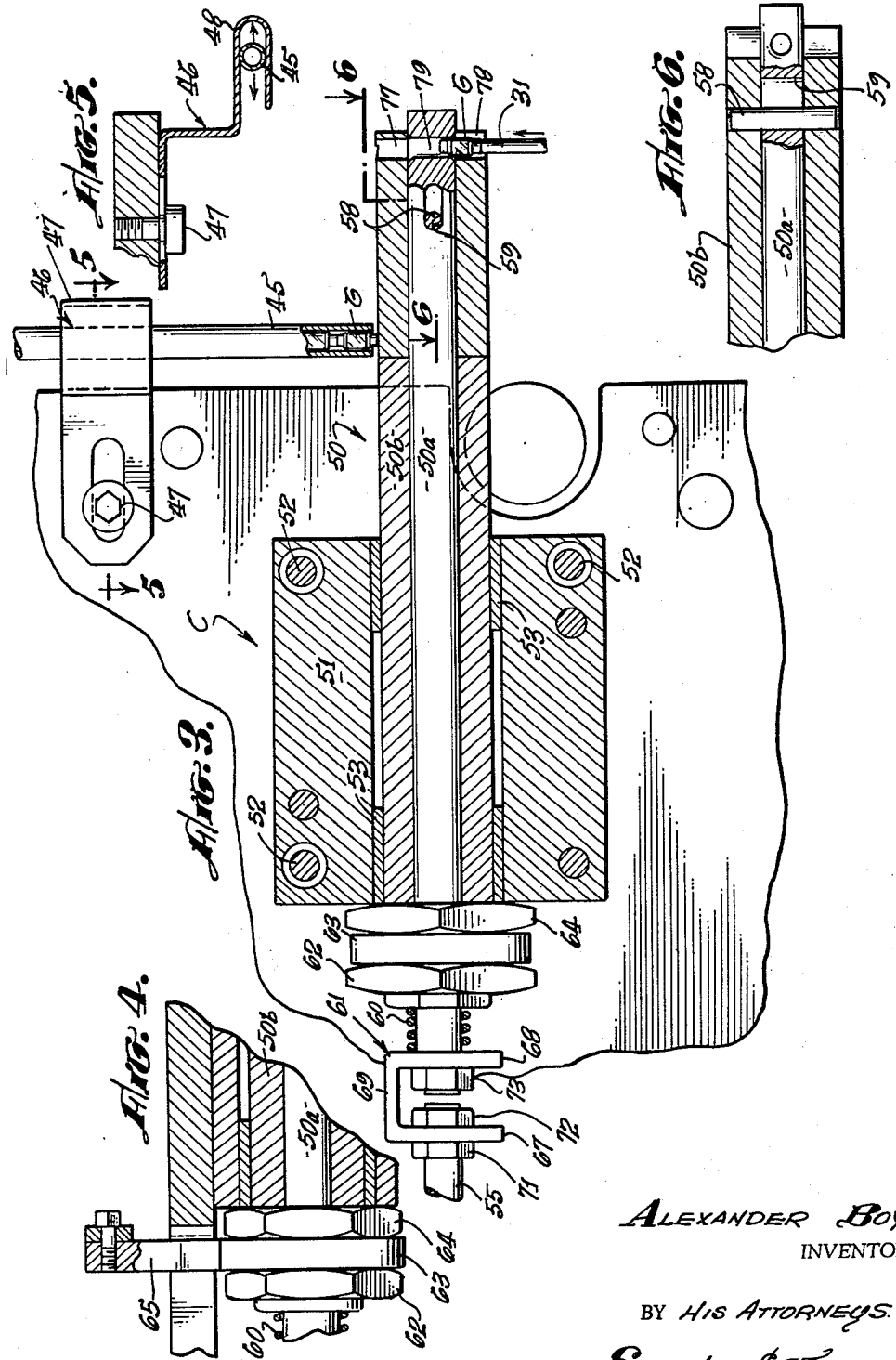

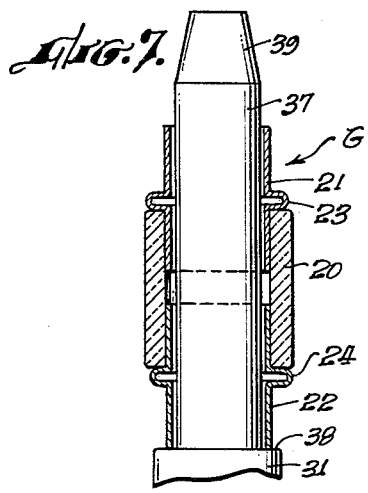
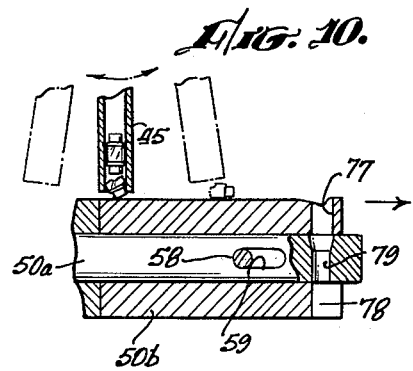
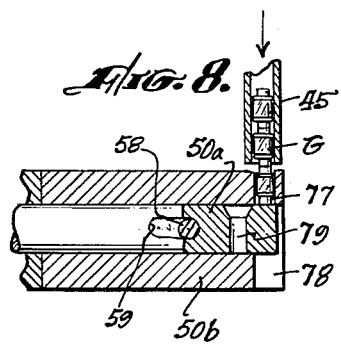
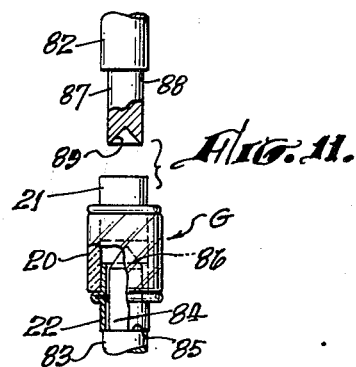
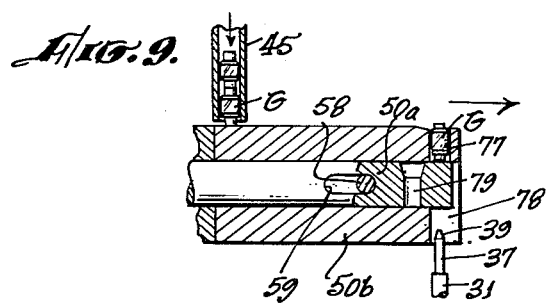
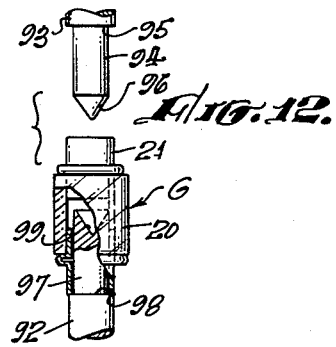

United States Patent Office 3,178,275
Patented Apr. 13, 1965

3,178,275
AUTOMATIC FEED FUSION MACHINES
Alexander Boyd, Los Angeles, Calif., assignor to TRW Semiconductors, Inc., Lawndale, Calif., a corporation of Delaware
Filed Apr. 23, 1962, Ser. No. 189,460
8 Claims. (Cl. 65—154)

This invention relates to a semiconductor assembly apparatus and more particularly to an apparatus for automatically feeding components to a fusion machine.

In the production of semiconductor devices such as semiconductor diodes, one means of encapsulating the semiconductor device is through utilization of a glass cylinder into each end of which is inserted a metal shell. The glass cylinder and the metal shells are mateable and are fused together to form a hermetic seal, the resulting assembly being called a fused body subassembly. Such an encapsulation envelope is shown and described in U.S. Patent No. 2,815,474, entitled "Glass Sealed Semiconductor Rectifier," by William M. Lewis, Jr., and Henry D. Frazier, issued December 3, 1957, and assigned to the assignee of the present invention. To facilitate presentation of the glass cylinder and metal shells to a fusion machine for hermetic sealing, the metal shells are preassembled with a glass cylinder and there held in the desired alignment and relationship by partially shrinking the glass cylinder onto the metal shell in a process known as the "black seal" process. The black seal process is fully described in copending U.S. patent application Serial No. 786,316, entitled "Glass-To-Metal Seal," filed January 12, 1959, by Clinton E. Maiden, and assigned to the assignee of the present invention. Prior to the present invention, upon completion of the black seal process each of the preassembled encapsulating structures was individually, manually positioned on the mandrels of an R.F. fusion machine, the mandrels then holding the structure and carrying it into an induction heating coil for fusion of the glass cylinder to the metal shells, to form the desired hermetic seal. The manual feeding of the pre-assembled structures to a fusion machine is quite costly since it is a very slow operation requiring an individual operator for each fusion machine. The present invention is directed toward the automatic feeding of the preassembled encapsulating structures to a fusion machine.

Accordingly, it is an object of the present invention to provide an improved method and apparatus for automatically feeding small articles to a machine.

It is also an object of the present invention to provide a method and apparatus for automatically feeding semiconductor device encapsulating structures to a fusion machine.

It is another object of the present invention to provide a method and apparatus for rapidly feeding preassembled glass cylinders and metal shells to a fusion machine.

It is a further object of the present invention to provide a method and apparatus for fusing an encapsulating body having metal shells inserted into opposed ends of a glass cylinder.

It is yet another object of the present invention to provide an apparatus for rapidly fusing glass to metal to form a hermetic seal.

The objects of the present invention are accomplished, in general by feeding the preassembled encapsulating structures into a radial aperture in a feed tube within which is fitted a feed rod, the encapsulating structure coming to rest on the peripheral surface of the feed rod. The feed tube and feed rod are moved as a unit to a position wherein the encapsulating structure is held above the mandrel of a fusion machine, the feed rod then being partially further advanced until a transverse aperture through the feed rod is aligned with the radial aperture in the feed tube to allow the encapsulating structure to fall downward onto the mandrel where it is positioned in an induction heating coil. The feed tube and feed rod are then withdrawn and the heating coil energized, whereupon fusion of the metal shells to the glass cylinder occurs. The mandrel is then moved downward through a stripping die through which the subassembly cannot pass, the subassembly thereby being stripped from the mandrel and remaining on the upper surface of the stripping die. The subassembly is then blown off of the upper surface of the stripping die by air pressure and into a receptacle, while the mandrel is returning to its original position for another fusion cycle.

The novel features which are believed to be characteristic of the invention, together with further objects and advantages thereof, will be better understood from the following description considered in connection with the accompanying drawing in which a presently preferred embodiment of the invention is illustrated by way of example. It is to be expressly understood however, that the drawings are for the purpose of illustration and description only and are not intended as a definition of the limits of the invention.

In the drawing:

FIGURE 1 is a pictorial view depicting a bank of four fusion machines remotely controlled from a single station;

FIGURE 2 is an elevation view partially in section, showing the automatic feed apparatus in one of its positions;

FIGURE 3 of the drawing is an elevation view showing the feed apparatus in another position;

FIGURE 4 is a partial bottom view of the apparatus of FIGURE 3;

FIGURE 5 is a view taken along the line 5—5 of FIGURE 3;

FIGURE 6 is a view taken along line 6—6 of FIGURE 3;

FIGURE 7 is an elevation view, in section, showing a preassembled encapsulating structure mounted on the mandrel of the fusion machine;

FIGURE 8 is a partial view, in section, showing the feed apparatus in another position;

FIGURE 9 is a partial view, in section, showing the feed apparatus in still another position;

FIGURE 10 is a partial view, in section, illustrating the automatic removal of a broken or damaged encapsulating structure;

FIGURE 11 is an elevation view depicting a fusion machine using two mandrels; and, FIGURE 12 is an elevation view showing a modification of the two-mandrel configuration of FIGURE 11.

Referring now to the drawings and more particularly to FIGURE 1 thereof, there is shown a pictorial view depicting how a number of the automatically fed fusion machines may be controlled by a single operator from a remote control station generally indicated by the reference character A. Each of the fusion machines includes an appropriate electrical supply and an air pressure supply which are controlled from the station A. The electrical and air pressure supplies, and appropriate control circuitry therefor, are well known in the art, and hence will be discussed primarily in terms of their desired functions. The apparatus of the present invention comprises in general a mandrel assembly B, an automatic feeder assembly C and an induction heating assembly D, and an automatic parts transporting assembly E.

In FIGURE 7 of the drawings there is shown a preassembled semiconductor encapsulating structure ready to be fused by the present invention apparatus. The preassembled encapsulating structure is generally indicated by the reference character G, and comprises a glass cylinder 20 and two identical metal cylindrical shells 21 and 22 inserted into opposite ends of the glass cylinder 20. The shells 21 and 22 are formed of metal such as Kovar and when presented to the fusion machine are affixed to the glass cylinder as the result of previously subjecting the parts to the black seal process. The shells 21 and 22 in the illustrated embodiment have a respective shoulder 23 and 24 which defines the extent to which the shells are inserted into the glass cylinder. The portion of the shells which enter the cylinder have an outside diameter substantially equal to but less than the inside diameter of the glass cylinder. Upon heating in the fusion machine the glass becomes molten and fuses to the shells, the union between the glass cylinder and the shells forming a hermetic seal. Although the present invention is applicable to various configurations and sizes of the encapsulating structures, for purposes of illustration and clarity the glass cylinder to be fused in the presently preferred embodiment has an outer diameter of 0.13 inch, a length of 0.28 inch and an inside diameter of 0.09 inch.

FIGURE 2 of the drawing depicts the relative positioning and spacing of the various parts of the fusion machine. The mandrel assembly B is positioned adjacent to the induction heating assembly D and is movable toward and away therefrom by means of air pressure. The induction heating assembly D is of the type well known to the art and has a heating or work coil 30 energized by a radio frequency generator, not shown. The radio frequency generator preferably operates at a frequency at or above 1.5 mc. to 25.0 mc. The R.F. generator is controlled from the remote control unit A, the coil 30 being selectively energized and deenergized in a programed sequence as described hereinafter. The R.F. generator is of the type having a variable power control for adjustment of the heating intensity in the heating area or fusion zone. The coil 30 in the presently preferred embodiment is designed to provide a maximum amount of clearance between its inside diameter and the outer diameter of the structures G to provide adequate heating near the middle of the power range of the R.F. generator.

The mandrel assembly B includes a mandrel 31 held in a collet 32 at one end of a piston rod 33, the other end of the piston rod 33 being coupled to a piston within an air cylinder, not shown. The end of the piston rod 33 including the collet 32 is slidably maintained in vertical alignment within a housing 34. The piston rod 33 is normally maintained in an uppermost position, as shown in FIGURE 2, and is movable to a lowermost position in response to the selective application of air pressure to the piston at the other end of the piston rod. In the uppermost position of the piston rod the upper surface of the collet 32 abuts against a stripper die 35 which forms a cap mounted to the upper end of the housing 34. The stripper die 35 has a central aperture 36 of a diameter slightly greater than that of the main portion of the mandrel 31.

As can best be seen in FIGURE 7, the projecting end of the mandrel 31 defines a reduced diameter portion 37 extending upwardly from a circumferential shoulder 38, and terminating in a tapered tip portion 39. The length of the reduced diameter portion 37 is slightly greater than the length of the preassembled encapsulating structures G and is of a diameter slightly less than the inner diameter of the metal shells 21 and 22. With the piston rod 33 in its normal uppermost portion, as shown in FIGURE 2, the mandrel 31 extends upwardly through the aperture 36 in the stripper die 35 and through the center of the coil 30. In this position, the circumferential shoulder 38 is slightly below the coil 30 so that when a structure G is mounted on the reduced diameter portion 37, the structure G is centered in the most intense portion of the induction field of the coil 30. The mandrel 31 is formed of a material having a relatively high melting point, such as stainless steel, with the upper end of the mandrel being tipped with Inconel X alloy. A more detailed explanation of the mandrel assembly and the induction heating assembly may be found in U.S. Patent No. 3,080,738, entitled "Single Station Fusion Machine for Making Semi-Conductor Device," issued March 12, 1963, by Henry D. Frazier and Pat W. Richey, and also assigned to the assignee of the present invention. For purposes of explanation, the mandrel assembly B and the induction heating assembly D will be referred to as being positioned at a "fusion station."

The automatic parts transporting assembly E comprises a vibratory bowl feeder of the type well known to the art, together with a suitable tube for dispensing of the parts fed from the bowl. A presently preferred vibratory parts feeder is that manufactured under the trademark "Syntron" by the Syntron Company of Homer City, Pennsylvania. In such a vibratory parts feeder, the parts to be fed are poured into a vibrating bowl, the parts then being automatically aligned and individually fed into a tube for transportation to any designated point. In FIGURE 2 of the drawing the tube transporting the preassembled encapsulating structures G from the vibratory parts feeder is indicated by the reference numeral 40. The tube 40 is of a transparent, flexible material, such as polyethylene and terminates in a metal sleeve 41 loosely held in a bracket 42. A helical spring 43 has one end fastened to the bracket 42 and its other end fastened to the tube 40. Coupled to the other end of the sleeve 41 is a stainless steel drop tube 45, the drop tube 45 passing through a guide bracket 46. The guide bracket 46 is mounted by means of a screw 47 to the structure of the fusion machine. As can best be seen from FIGURE 5, the guide bracket 46 defines an elongated loop portion 48 which permits lateral movement of the drop tube 45 within the bracket. Since the sleeve 41 is loosely held within the bracket 42, the drop tube 45 may be swung in an arc (as indicated by the dotted lines in FIGURE 10) about the mounting point of the sleeve 41 in the bracket 42, for a purpose which is explained hereinbelow. The helical spring 43 serves to normally maintain the drop tube 45 in generally vertical alignment. Upon passing through the tubes 40 and 45, the preassembled encapsulating structures G issue from the open tip 49 of the drop tube 45. For purposes of explanation the tip of the tube 49 is positioned at what will be called a "loading station."

Referring now specifically to FIGURES 2 and 3 of the drawing there is illustrated the structure of the automatic feeder assembly C. The feeder assembly C includes a feeder arm, generally indicated by the reference numeral 50 which slides within a support housing 51. The feeder arm 50 is formed of two parts: a feeder rod 50a, sliding within a feeder tube 50b. The support housing 51 is mounted to the fusion machine structure by the means of screws 52. The housing 51 defines a horizontal circular cylindrical aperture therethrough provided with tubular bearing surfaces 53. The interior diameter of the tubular bearing surfaces 53 are substantially equal to but slightly greater than the outer diameter of the feeder tube 50b so that the feeder arm 50 may freely horizontally slide within the housing 51.

One end of the feeder rod 50a is rigidly coupled to a piston rod 55, which slides within an air cylinder 56. The piston rod 55 is normally almost completely contained within the air cylinder 56 in the position shown in FIGURE 2. Upon the selective application of air pressure to the cylinder 56 the piston rod 55 is moved to an extended position which causes the feeder arm 50 to be moved to the right to the position shown in FIGURE 3. The admission of air to the air cylinder 56 is controlled from the remote control unit A.

The feeder rod 50a slides freely within the feeder tube 50b, being restrained from rotating within the tube 50b by a transverse pin 58 which projects through a longitudinal slot 59 in the rod 50a (see FIGURE 6), the length of the slot 59 determining the extent to which the rod 50a can slide within the tube 50b. The feeder rod 50a is normally maintained in a specific relationship with the feeder tube 50b by means of a helical override spring 60 which abuts at one end against a coupling clamp 61 on one end of the feeder rod 50a and at its other end against one side of an adjusting nut 62 threaded on one end of the feeder tube 50b. Abutted against the other side of the adjusting nut 62 is an alignment cam 63, followed by a stop nut 64. The alignment cam 63 has a radial projection 65, as can best be seen in FIGURE 4, which serves to trip certain microswitches (not shown) during axial movement of the feeder arm 50. The helical spring 60 serves to normally maintain the projecting ends of the feeder rod 50a and feeder tube 50b in coextensive alignment. Thus, when the feeder arm 50 is moved to the right by the application of air pressure to the air cylinder 56, the force of the helical spring 60 will cause the feeder tube 50b to move along with the feeder rod 50a as a unit until the stop nut 64 abuts against one end of the support housing 51, at which time movement of the feeder tube 50b will be arrested while the feeder rod 50a moves farther toward the right in response to the air pressure applied to the piston rod 55. When the left end of the slot 59 contacts the transverse pin 58, motion of the feeder rod 50a will then be arrested, and the feeder arm 50 will then be in the position shown in FIGURE 3. Upon release of the air pressure from the air cylinder 56 and subsequent return of the piston rod 55 to the position shown in FIGURE 2, the feeder arm 50 will be moved to the left while the expansion of the spring 60 moves the feeder tube 50b until its projecting end is again in coextensive alignment with the projecting ends of the feeder rod 50a.

The coupling clamp 61 is a generally C-shaped channel section, as can best be seen in FIGURE 3, defining flange portions 67 and 68 projecting from either end of a web portion 69. The flange portion 67 is secured to the end of the piston rod 55 by nuts 71 and 72. The flange portion 68 is retained on the end of the feeder rod 50a by a nut 73, the flange portion 68 being urged against the nut 73 by the pressure of the helical override spring 60. Thus the clamp 61 serves to rigidly couple the feeder rod 50a to the piston rod 55.

The projecting end of the feeder tube 50b is provided with a radial vertical aperture 77, extending from the uppermost surface of the tube and communicating with the interior of the tube. The diameter of the aperture 77 is slightly greater than the maximum diameter of the encapsulating structures G so that the preassembled structures can pass freely through the aperture. The lowermost portion of the projecting end of the feeder tube 50b defines a notch 78 which extends axially of the tube a sufficient distance so that the notch is positioned below the aperture 77 in the uppermost surface of the tube. The projecting tip portion of the feeder rod is provided with a partially tapered vertical passageway 79 of circular cross section extending completely therethrough. The main diameter of the passageway 79 is equal to the diameter of the aperture 77 in the feeder tube 50b. Thus, when the passageway 79 is aligned beneath the aperture 77 a preassembled structure G can easily pass completely through the aperture 77, the passageway 79 and the notch 78. The passageway 79 is spaced a greater distance from the projecting end of the feeder rod 50a than the aperture 77 is spaced from the projecting end of the feeder tube 50b, so that in the normal position of FIGURE 2, wherein the projecting end of the rod and the tube are in coextensive alignment, the passageway 79 is displaced from the aperture 77 as shown in FIGURE 8. In this position, the aperture 77 in the feeder tube 50b is positioned at the loading station and in coaxial alignment with the stainless steel tube 45 containing the preassembled structures G. Thus, in the loading position the lowermost of the preassembled structures G in the tube 45 will be fed by gravity into the aperture 77 and will come to rest on the uppermost surface of the feeder rod 50a, since the passageway 79 is displaced from the aperture 77. This can best be seen from the enlarged view of FIGURE 8. Thus, each time the feeder arm 50 returns to the normal position with the projecting end of the arm at the loading station, another of the preassembled structures will be gravity fed into the aperture 77.

Next, air pressure is supplied to the air cylinder 56 to cause the piston rod 55 to be ejected from the cylinder and so move the feeder arm 50 to the right. As the feeder arm 50 moves to the right the stop nut 64 on the feeder tube 50b strikes the side of the housing 51 and arrests motion of the feeder tube 50b. At this particular instant of time, as can be seen from the view shown in FIGURE 9, the projecting end of the feeder arm 50 is positioned at the fusion station with the tip portion 39 of the mandrel 31 disposed within the notch 78 and in coaxial alignment with the aperture 77 in the feeder tube 50b, and the preassembled structure G contained within the aperture 77 is still resting upon the uppermost surface of the feeder rod 50a. Although the linear motion of the feeder tube 50b has just become arrested by abutment of the stop nut 64 against the support housing 51, the feeder rod 50a is still moving toward the right and shortly thereafter will reach the extent of its travel, this position being shown in FIGURES 3 and 6 of the drawings. The motion of the feeder rod 50a after the feeder tube 50b has stopped causes compression of the helical spring 60, and when the pin 58 projecting radially through the slot 59 in the feeder rod 50a comes into contact with the left end of the slot, the motion of the feeder rod 50a is arrested. The positioning and length of the slot is predetermined so that the motion of the feeder rod 50a will become arrested with the passageway 79 in coaxial alignment with the aperture 77 in the feeder tube 50b so that the preassembled structure G will fall by gravity through the passageway 79 and onto the reduced diameter portion 37 of the mandrel 31, the structure G sliding down the mandrel tip until it comes to rest on the shoulder 38, as shown in FIGURE 7.

Next, the air pressure in the cylinder 56 is released, thereby allowing the feeder arm 50 to return to the position shown in FIGURE 2, expansion of the helical spring 60 causing movement of the feeder tube 50b relative to the feeder rod 50a until their projecting ends are again in coextensive alignment, at which point the right end of the slot 59 again contacts the pin 58. As the projecting end of the feeder rod 50 is moving from the fusion station back toward the loading station, R.F. energy is applied to the heating coil 30, the resulting inductive heating effect causing fusion of the glass and metal of the preassembled structure G to thereby form the desired fused subassembly. The fused subassembly is generally indicated by the reference numeral 80, to distinguish it from the preassembled structure G from which it was formed. The time period during which the coil 30 is energized is controlled by timing means well known to the art.

Immediately upon completion of the fusion step, the piston rod 33 is automatically moved downward by the selective application of air pressure to the piston connected at the end of the rod. The piston rod 33 moves downwardly to a lowermost position at which the tapered tip portion 39 of the mandrel 31 is below the upper surface of the stripping die 35. Since the aperture 36 in the stripping die 35 is too small to allow passage therethrough of the fused subassembly 80, the fused subassembly remains on the upper surface of the stripping die 35 while the mandrel continues downward, the fused subassembly thereby being effectively stripped from the mandrel. At this point the fused subassembly is blown off of the stripping die 35 by an air jet from a tube 75 directed at the stripping die 35. (The tube 75 can best be seen from FIGURE 2, although the view of FIGURE 2 shows the mandrel 31 in the uppermost position rather than in the lowermost position.) The fused subassembly 80, after being blown from the stripping die 35, strikes the side walls of a receptacle 76 and then falls to the bottom of the receptacle. The view of FIGURE 2 shows a plurality of fused subassemblies 80 resting on the bottom of the receptacle 76. Immediately after the fused subassembly 80 is blow off of the stripping die 35, the piston rod 33 is automatically returned to its uppermost position by the selective release of air pressure, thereby returning the mandrel 31 to the uppermost position shown in FIGURE 2. At this point one complete cycle of fusion operation has been completed and another preassembled structure G has been gravity fed into the aperture 77 of the feeder tube 50b in preparation for the next succeeding fusion cycle.

One fusion cycle therefore includes six separate and automatic operations. First, with the apparatus in the loading position as shown in FIGURE 2 of the drawing, a preassembled encapsulating structure G is gravity fed into the aperture 77 of the feeder tube 50b. Second, the feeder arm 50 is moved toward the fusion station by application of air pressure to the cylinder 56 and the motion of the feeder tube 50b is arrested at the fusion station. Third, the motion of the feeder rod 50a is arrested when the passageway 79 becomes aligned with the aperture 77, thereby allowing the preassembled structure G contained within the aperture 77 to drop through the passageway 79 and onto the tip of the mandrel 31. Fourth, the fusion operation is initiated by application of R.F. energy to the coil 30, while the feeder arm 50 is being returned to the loading position. Fifth, upon completion of the fusion operation the mandrel 31 is moved downward through the stripping die 35 to strip the completed fused subassembly from the mandrel, the fused subassembly then being blown off the surface of the stripper die and into the receptacle 76. Sixth, the air pressure on the piston rod 33 is released to allow the mandrel 31 to return to its uppermost position. As stated hereinabove, suitable circuitry for controlling the air pressure and electrical current is provided in accordance with practices well known in the arts, the various control functions being determined by settings of various timing and synchronizing devices contained in the remote control station A. Since the operation of the hereinabove described fusion apparatus is entirely automatic, including the feeding and removal of parts therefrom, a plurality of fusion machines can be controlled by a single operator from a single remote control station as illustrated in FIGURE 1.

Occasionally a fused subassembly might not be cleared from the mandrel 31, which means that the next succeeding preassembled structure cannot fall onto the mandrel from the feeder arm 50. In such a case, the next succeeding preassembled structure will then be returned by the feed arm to the loading station where it will strike the next structure in the drop tube 45, thereby breaking the structure due to the force of the override spring 60. To prevent structure breakage under these circumstances, the drop tube 45 is spring mounted as explained hereinabove and as shown in FIGURES 2 and 10. When a preassembled structure G remains in the feeder arm 50 and is returned to the loading station and strikes the next succeeding structure in the drop tube 45, it will not break but will cause the drop tube 45 to be moved within the looped portion 48 of the bracket 46, pivoting at the point at which the sleeve 41 is secured in the bracket 42. Movement of the drop tube 45 is restricted by the spring 43, and upon subsequent movement of the feeder arm 50 back toward the fusion station the drop tube 45 is swung in an arc toward the fusion station to permit the broken pieces to be automatically ejected. The drop tube 45 is then returned by the force of the spring 43 to a substantially vertical alignment and the next succeeding preassembled structure G partially emerges from the tube until the lowermost shell rests upon the upper surface of the feeder tube 50b.

In FIGURE 11 of the drawings, there is shown an alternative mandrel arrangement utilizing two mandrels instead of one mandrel. In the embodiment of FIGURE 11, an upper mandrel 82 is provided above and in coaxial alignment with a lower mandrel 83. The lower mandrel 83 has a reduced diameter portion 84 extending upwardly from a shoulder 85, and terminating in a conical tip portion 86. The upper mandrel 82 has a reduced diameter portion 87 extending downwardly from a shoulder 88. The mandrel 82 has a concave depression 89 in the projecting end of the reduced diameter portion 87, the depression 89 being complementary and mateable with the conical tip 86 of the mandrel 83. The lengths of the reduced diameter portions 84 and 87 are predetermined so that when the conical tip 86 of the mandrel 83 is mated with the depression 89 in the mandrel 82, the distance between the shoulders 85 and 88 corresponds to the desired length of the fused subassembly. The lower mandrel 83 is normally maintained by spring pressure slightly above the heating coil, the upper mandrel 82 being selectively moveable downwardly into engagement with the lower mandrel. In operation, a preassembled encapsulating structure G is loaded upon the lower mandrel 83 by the feed arm 50, the upper mandrel 82 being maintained in an uppermost position which allows passage of the projecting end of the feeder arm 50 thereunder. Upon withdrawal of the feeder arm 50, the upper mandrel 82 is urged downward by air pressure, the reduced diameter portion 87 entering the preassembled encapsulating structure G mounted on the lower mandrel 83. When the shoulder 88 on the upper mandrel 82 contacts the upper end of the shell 21 of the structure G, the mandrel 82 continues downward slightly against the spring loading of the lower mandrel 83 to properly position the structure G within the field of the heating coil. The upper mandrel is then maintained in this position. If the glass cylinder 20 is of the minimum length permissible under production tolerances the conical tip 86 of the lower mandrel 83 will be mated within the depression 89 in the upper mandrel 82. If the glass cylinder 20 is of the maximum length permissible under production tolerances the conical tip of the lower mandrel will not be firmly seated within the depression in the tip of the upper mandrel. However, upon softening of the glass during the fusion operation, the spring loading of the lower mandrel 83 will urge the lower mandrel upward until the conical tip 86 is firmly seated against the depression 89, thereby maintaining the structure at the desired length. Upon completion of the fusion operation, the upper mandrel 82 is then returned to its uppermost position and the fused subassembly stripped from the lower mandrel 83 as described hereinabove, in preparation for the next fusion cycle.

FIGURE 12 of the drawing shows an alternative embodiment similar to the embodiment of FIGURE 11, with the exception that the positions of the mandrels have been reversed. In the embodiment of FIGURE 12, a lower mandrel 92 corresponds in shape to the upper mandrel 82 in FIGURE 11, and an upper mandrel 93 corresponds in shape to the lower mandrel 83 of FIGURE 11. The upper mandrel 93 has a reduced diameter portion 94 extending downwardly from a shoulder 95, and terminating in a conical tip 96. The lower mandrel 92 has a reduced diameter portion 97, extending upwardly from a shoulder 98. The projecting tip of the lower mandrel 92 has a conical depression 99 complementary to the conical tip 96 of the upper mandrel 93. The movement and cooperation of the upper and lower mandrels in the embodiment of FIGURE 12 is identical with the cooperation of the upper and lower mandrels of FIGURE 11. An exemplary embodiment of electrical control circuitry suitable for use with the above described apparatus is disclosed in the aforementioned U.S. Patent No. 3,080,738.

Although the invention has been described with a certain degree of particularity, it is understood that the present disclosure has been made only by way of example, and that numerous changes in the details of construction and the combination and arrangement of parts may be resorted to without departing from the spirit and the scope of the invention as hereinafter claimed.

What is claimed is:

1. In an apparatus for fusing preassembled coaxial encapsulating structures formed of a tubular glass cylinder having a metal shell partially inserted in each of its ends, wherein structures to be fused are individually positioned within a fusion zone, the improvement comprising:
   (a) an upwardly extending elongate mandrel adapted to support encapsulating structures in said fusion zone,
   (b) means laterally of said mandrel for feeding encapsulating structures,
   (c) and means for receiving encapsulating structures from said feeding means and for delivering them to said mandrel comprising first and second laterally movable elements each having an aperture therethrough at least as large as said structure adjacent juxtaposed ends thereof, and means for positioning said elements with said apertures non-aligned when the aperture of the element closest to said feeding means is in position to receive a said structure from said feeding means and for positioning said elements with said apertures aligned in juxtaposition with said mandrel.

2. In an apparatus for fusing preassembled coaxial encapsulating structures formed of a tubular glass cylinder having a metal shell partially inserted in each of its ends, wherein structures to be fused are individually positioned within a fusion zone, the improvement comprising:
   (a) an upwardly extending elongate mandrel adapted to support encapsulating structures in said fusion zone,
   (b) means laterally of said mandrel for feeding encapsulating structures,
   (c) and means for receiving encapsulating structures from said feeding means and for delivering them to said mandrel comprising a laterally movable tube and a laterally movable rod therein each having an aperture therethrough at least as large as said structure adjacent juxtaposed ends thereof, and means for positioning said tube and rod with said apertures non-aligned when the aperture of the tube is in position to receive a said structure from said feeding means and for positioning said tube and rod with said apertures aligned in juxtaposition with said mandrel.

3. The apparatus of claim 2 wherein the aperture on the underside of said tube is a notch, whereby said tube notch may receive said mandrel.

4. In an apparatus for fusing preassembled coaxial encapsulating structures formed of a tubular glass cylinder having a metal shell partially inserted in each of its ends, wherein structures to be fused are individually positioned within a fusion zone, the improvement comprising:
   (a) an upwardly extending elongate mandrel adapted to support encapsulating structures in said fusion zone,
   (b) means laterally of said mandrel for feeding encapsulating structures,
   (c) and means for receiving encapsulating structures from said feeding means and for delivering them to said mandrel comprising first and second laterally movable elements each having an aperture therethrough at least as large as said structure adjacent juxtaposed ends thereof, and means for positioning said elements with said apertures non-aligned when the aperture of the element closest to said feeding means is in position to receive a said structure from said feeding means and for positioning said elements with said apertures aligned in juxtaposition with said mandrel, said last mentioned means comprising motor means, means rigidly coupling said motor means to said first element, spring means between said elements and urging said elements to the position in which said apertures are not aligned, and means for stopping the motion of said second element during movement of said elements from said feeding means to said mandrel whereby compression of said spring will permit said first element to be further moved by said motor means into the position in which said apertures are aligned.

5. In an apparatus for fusing preassembled coaxial encapsulating structures formed of a tubular glass cylinder having a metal shell partially inserted in each of its ends, wherein structures to be fused are individually positioned within a fusion zone, the improvement comprising:
   (a) an upwardly extending elongate mandrel adapted to support encapsulating structures in said fusion zone,
   (b) means laterally of said mandrel for feeding encapsulating structures,
   (c) and means for receiving encapsulating structures from said feeding means and for delivering them to said mandrel comprising first and second laterally movable elements each having an aperture therethrough at least as large as said structure adjacent juxtaposed ends thereof, and means for positioning said elements with said apertures non-aligned when the aperture of the element closest to said feeding means is in position to receive a said structure from said feeding means and for positioning said elements with said apertures aligned in juxtaposition with said mandrel,
   (d) said feeding means comprising a substantially vertical tube having its lower end proximate said elements, and means for pivotally mounting said tube on an axis above said elements and transverse to the direction of movement thereof.

6. In an apparatus for fusing preassembled coaxial encapsulating structures formed of a tubular glass cylinder having a metal shell partially inserted in each of its ends, wherein structures to be fused are individually positioned within a fusion zone, the improvement comprising:
   (a) an upwardly extending elongate mandrel adapted to support encapsulating structures in said fusion zone,
   (b) means laterally of said mandrel for feeding encapsulating structures,
   (c) and means for receiving encapsulating structures from said feeding means and for delivering them to said mandrel comprising first and second laterally movable elements each having an aperture therethrough at least as large as said structure adjacent juxtaposed ends thereof, and means for positioning said elements with said apertures non-aligned when the aperture of the element closest to said feeding means is in position to receive a said structure from said feeding means and for positioning said elements with said apertures in juxtaposition with said mandrel,
   (d) said feeding means comprising a substantially vertical tube having its lower end above the nearest element less than the length of an encapsulating structure, and means for pivotally mounting said tube on an axis above said elements and transverse to the direction of movement thereof.

7. In an apparatus for fusing preassembled coaxial encapsulating structures formed of a tubular glass cylinder having a metal shell partially inserted in each of its ends, wherein structures to be fused are individually positioned within a fusion zone, the improvement comprising:
   (a) an upwardly extending elongate mandrel mounted for selective vertical movement between an uppermost position and a lowermost position, said mandrel having a cylindrical tip portion vertically extending into said fusion zone when said mandrel is in said uppermost position, said vertically extending tip portion being of circular cross-section with a diameter slightly less than the inner diameter of said encapsulating structures, said mandrel being adapted to support encapsulating structures coaxially disposed on said tip portion, (b) means laterally of said mandrel for feeding encapsulating structures, (c) and means for receiving encapsulating structures from said feeding means and for delivering them to said mandrel comprising first and second laterally movable elements each having an aperture therethrough at least as large as said structure adjacent juxtaposed ends thereof, and means for positioning said elements with said apertures non-aligend when the aperture of the element closest to said feeding means is in position to receive a said structure from said feeding means and for positioning said elements with said apertures aligned in juxtaposition with said mandrel.

8. In an apparatus for fusing preassembled coaxial encapsulating structures formed of a tubular glass cylinder having a metal shell partially inserted in each of its ends, wherein structures to be fused are individually positioned within a fusion zone, the improvement comprising:

(a) an upwardly extending elongate mandrel of circular cross-section defining a main body portion and a reduced diameter cylindrical tip portion vertically extending into said fusion zone, the diameter of said main body portion being slightly greater than the diameter of said metal shells but less than the diameter of said glass cylinder, the diameter of said vertically extending tip portion being slightly less than the inner diameter of said encapsulating structures whereby an encapsulating structure coaxially disposed on said mandrel will be retained on said tip portion, (b) means laterally of said mandrel for feeding encapsulating structures, (c) and means for receiving encapsulating structures from said feeding means and for delivering them to said mandrel comprising first and second laterally movable elements each having an aperture therethrough at least as large as said structure adjacent juxtaposed ends thereof, and means for positioning said elements with said apertures non-aligned when the aperture of the element closest to said feeding means is in position to receive a said structure from said feeding means and for positioning said elements with said apertures aligned in juxtaposition with said mandrel.

References Cited by the Examiner

UNITED STATES PATENTS

| 1,524,139 | 1/25 | Klagges | 221—224 XR |
| 1,712,831 | 5/29 | Laurence | 214—8.5 |
| 2,509,622 | 5/50 | Woolcott | 215—8.5 |
| 3,080,738 | 3/63 | Frasier et al. | 65—154 |

DONALL H. SYLVESTER, *Primary Examiner.*